(12) United States Patent
Dicke et al.

(10) Patent No.: US 6,467,967 B2
(45) Date of Patent: Oct. 22, 2002

(54) SHOE BEARING FOR ROTARY DRUMS SUCH AS FOR EXAMPLE TUBE MILLS

(75) Inventors: Rüdiger Dicke, Bergisch-Gladbach (DE); Alexander Hagedorn, Pulheim (DE)

(73) Assignee: KHD Humboldt Wedag, AG, Cologne (DE)

( * ) Notice: Subject to any disclaimer, the term of this patent is extended or adjusted under 35 U.S.C. 154(b) by 0 days.

(21) Appl. No.: 09/865,051

(22) Filed: May 24, 2001

(65) Prior Publication Data

US 2002/0001421 A1 Jan. 3, 2002

(30) Foreign Application Priority Data

May 30, 2000 (DE) .......................................... 100 26 752

(51) Int. Cl.$^7$ .............................................. F16C 17/03
(52) U.S. Cl. ...................................................... 384/310
(58) Field of Search .................................. 384/310, 311, 384/312, 117, 122

(56) References Cited

U.S. PATENT DOCUMENTS 4,032,199 A * 6/1977 Jenness ....................... 384/310

FOREIGN PATENT DOCUMENTS

| DE | 28 49 305 | 5/1980 |
| DE | 43 16 579 | 11/1994 |

* cited by examiner

*Primary Examiner*—Lenard A. Footland
(74) *Attorney, Agent, or Firm*—Charles L. Schwab; Nexsen Pruet Jacobs & Pollard, LLC

(57) ABSTRACT

A shoe bearing for a heavy rotary drum such as a cylindrical casing of a tube mill designed so that all the shoe bearing elements used at each bearing station are always uniformly loaded. One of the two outlying shoe bearing elements (11) is braced directly against the foundation (16) while the other shoe bearing elements (12, 13, 14) of the bearing station are supported on a flexible support cable (17).

8 Claims, 2 Drawing Sheets

SHOE BEARING FOR ROTARY DRUMS SUCH AS FOR EXAMPLE TUBE MILLS

TECHNICAL FIELD

This invention relates to a bearing for rotary drums, such as for example tube mills, in bearing stations each with a plurality of shoe bearing elements distributed about the lower circumferential region and bracing the rotary casing from below.

BACKGROUND OF THE INVENTION

In German patent document 43 16 579 A1, issued Nov. 11, 1994 to Klockner-Humboldt-Deutz AG, heavy ball mill casings are supported on a plurality of hydrostatically and/or hydrodynamically operated shoe bearing elements, for example on four such elements, arranged in distributed fashion about the lower rotary drum circumference. The rotary drum rests on cushions of pressurized oil, which is squeezed into the lubrication clearance between the four bearing shells and the braced rotary drum riding surface. All four shoe bearing elements are braced against the foundation via ball-and-socket joints and pairwise via a relatively costly articulated rocker lever construction.

If the radial distance of all shoe bearing elements from the rotary drum axis is not always set as equally great, it is not impossible that one bearing station with more than two neighboring shoe bearing elements becomes a statically indeterminate system. This is also the case for the bearing station disclosed in German patent document number 28 49 305, issued May 29, 1980 to Klockner-Humboldt-Deutz AG, in which a rotary drum is suspended in a belt-shaped steel band that completely encloses at least the lower half of the rotary drum and to the inside wall of which there are attached, for example, five sliding bearing elements spaced apart from one another but not all equally loaded. In this known bearing with the suspended rotary drum oscillating via the belt, the danger is furthermore not ruled out that, depending on the rotation speed of the supported rotary drum, the entire suspension bearing system and thus also the supported rotary drum can go into undesired operating conditions of resonance buildup and vibration.

OBJECTS AND SUMMARY OF THE INVENTION

It is an object of the invention to create a shoe bearing for heavy rotary drums, such as for example tube mills, which is designed in simple and lightweight fashion and in which it is guaranteed that all shoe bearing elements used at each bearing station are always uniformly loaded without resonance buildup at the bearing station.

While the weight forces of the supported rotary drum in the case of previously known shoe bearings are transmitted chiefly in the vertical direction into the foundation, in diametrically opposite fashion the weight forces of the supported rotary drum in the case of the shoe bearing according to the invention are redirected, by a carrying-cable support, largely into a horizontal direction and transferred into the foundation. At each bearing station, at least one of the two outlying shoe bearing elements is braced directly against the foundation while the other shoe bearing elements of the bearing station are fixed on a supporting cable. The supporting cable, stressed in tension, is capable of accepting and transmitting large tensile forces and thus large supporting forces. This supporting cable with the fixed shoe bearing elements has one end anchored on the foundation via a fixed bearing block and can be tensioned with a tensioning device or mechanism via the other end of the supporting cable. The bearing shells of the two outlying shoe bearing elements are supported on a spherical cap carried by the lower support part of the shoe bearing elements.

The supporting cable with the shoe bearing elements fixed thereto forms a sort of rope chain or link chain with full flexibility. The cable sections located between the neighboring shoe bearing elements can rotate or twist and also otherwise deform within certain limits. All four of the shoe bearing elements, or four hydrodynamic sliding bearings, distributed about the lower circumferential region of the rotary casing automatically adjust themselves so that the radial distance of all four bearing shells from the rotation axis of the supported rotary tube shell is always equal, even in case of flexures, changes of shape or changes of the inclination angle of the supported rotary casing. Thus all the shoe bearing elements are statically determinate and completely equally loaded without the necessity of costly control systems.

As a result of the carrying-cable support according to the invention, it is sufficient that the bearing shells of the outlying shoe bearing elements supporting the rotary casing each be supported by a spherical cap on the respective lower supporting part of the shoe bearing element. It may not be necessary to use a ball-and-socket joint in the shoe bearing elements lying in the central region, because the carrying cable permits articulation if the inclination angle of the supported rotary casing changes relative to the horizontal and/or if the rotary casing should flex or otherwise deform by certain amounts during its rotation.

Since at each bearing station at least one of the two outlying shoe bearing elements is supported directly on the foundation, resonance buildup and vibration is prevented by the shoe bearing of this invention. The carrying cable support, achieves all these advantages, and at the same time it is still designed in comparatively lightweight fashion and can be fabricated economically. Additionally, the shoe bearing of this invention, with carrying cable support, permits easy and rapid height adjustment of the supported rotary drum, and the rotary drum bearing housing sealing can be designed in simple fashion.

According to a further feature of the invention, the supporting parts of the bearing shells of the shoe bearing elements, may be fixed on the supporting cable by a clamp-block connection. The shoe bearing elements at each bearing station, arranged in distributed fashion about the lower rotary casing circumferential region can also, however, be flexibly connected to one another by a flexible support in the form of a link chain.

According to a further feature of the invention, the device for tensioning or retensioning of the supporting cable may include an arm holding the free end of the supporting cable, the arm being pivotally connected to the foundation via a pivot whose axis is substantially parallel to the axis of the supported cylindrical casing.

BRIEF DESCRIPITON OF THE INVENTION

The invention and its further features and advantages are explained in more detail on the basis of exemplary embodiments illustrated schematically in the drawings in which.

DETAILED DESCRIPTION OF THE DRAWINGS

Figure 1:
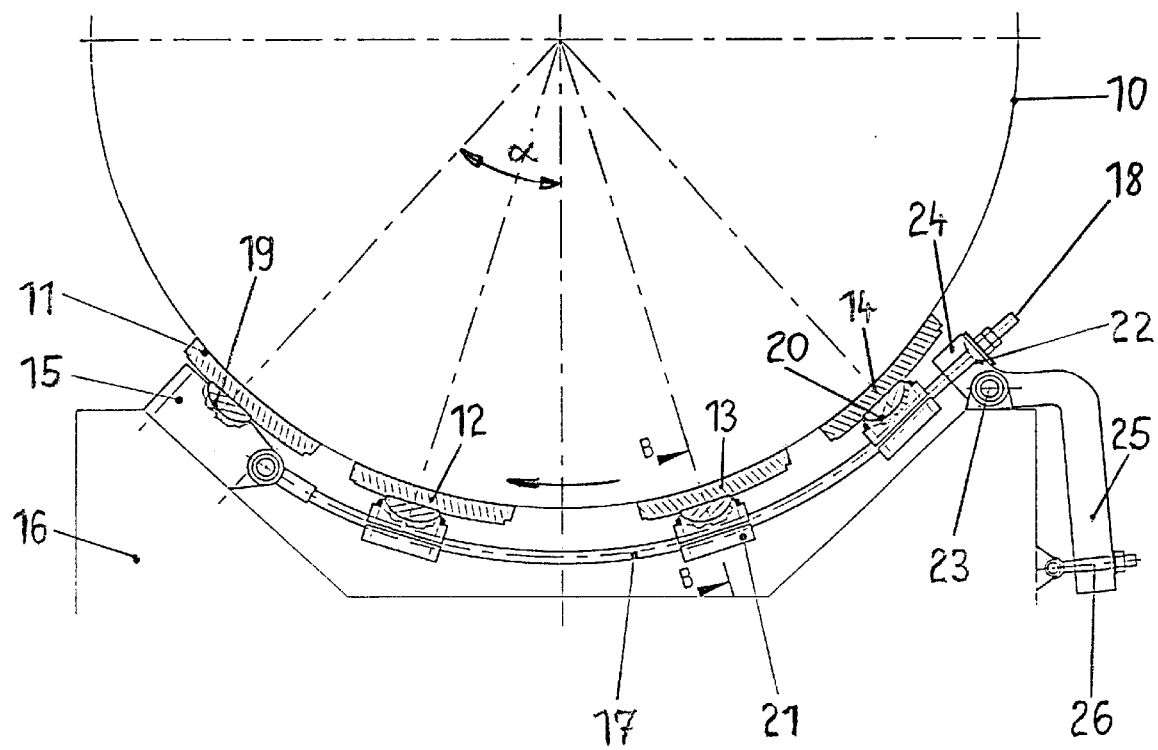
FIG. 1 shows in cross section the lower circumferential region of a large heavy rotary drum such as, for example, a tube mill, with, by way of example, four shoe bearing elements for the accommodation of the radial load at a bearing station of the rotary drum.

In FIG. 1, a cylindrical drum or casing 10 of a tube mill, which in the exemplary embodiment rotates clockwise, is radially braced at a bearing station on four shoe bearing elements 11, 12, 13, 14 distributed about the lower part of the casing circumference. The shoe bearing elements are hydrodynamic sliding bearings whose bearing shells, filled with pressurized oil, are adapted to the external outline of the rotary casing 10.

In order that the shoe bearing elements 11, 12, 13, 14 can always adjust themselves automatically in such a way that the radial distance of the sliding bearing shells from the rotation axis of the rotary casing 10 is always equal, at least one of the two outlying shoe bearing elements at each bearing station, in FIG. 1 the left shoe bearing element 11, is braced directly against a foundation 16 by a guide block 15 while the other shoe bearing elements 12, 13, 14 of the bearing station are supported on a flexible support in the form of a carrying cable 17 in such a way that these shoe bearing elements are securely fastened to the carrying cable 17. The carrying cable 17 with fixed shoe bearing elements 12, 13, 14 has its left end anchored to the fixed guide block 15 on the foundation 16, and it can be retensioned via the other end 18 of the carrying cable 17 with a tensioning device. The angle α between each outlying shoe bearing element and a vertical plane through the rotary casing axis should not exceed 45°. Instead of the four shoe bearing elements shown in the exemplary embodiment of the drawing, additional elements would also be possible.

At least in the case of the two outlying shoe bearing elements 11 and 14, the bearing shells supporting the rotary casing 10 from below are braced in ball-and-socket fashion on the respective lower supporting part of the shoe bearing elements via spherical caps 19, 20 respectively. In this way, all sliding bearing shells including the intermediate shoe bearing elements 12, 13, can execute all motions along with rotary casing 10, even if the inclination angle of the rotary casing relative to the horizontal changes and/or the rotary casing should flex or otherwise deform by certain amounts during its rotation. As shown in the drawings, the bearing shells of the central or intermediate shoe bearing elements 12, 13 also have spherical caps even though they are provided with additional flexibility imparted to them via the supporting cable 17.

Figure 2:
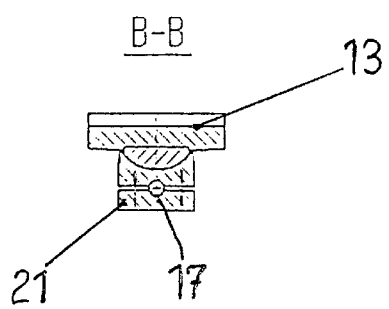
FIG. 2 shows the section along line B—B of FIG. 1 or, respectively, FIG. 3.

In FIG. 2 it can readily be seen that the lower supporting parts of the bearing shells of shoe bearing elements 12 to 14, fixed on the supporting cable 17, can be attached to the supporting cable 17 with a clamp-block connection. The neighboring shoe bearing elements or their lower supporting parts can, however, also be flexibly connected to one another by individual sections of the supporting cable in the manner of a link chain.

A tensioning device 22 for tensioning or retensioning the supporting cable 17 is in the form of a lever having an arm holding the free end 18 of the supporting cable. The lever is supported on the foundation 16 by a pivot 23 with a pivot axis lying roughly parallel to the supported rotary casing 10. In FIG. 1, the lever is a two-armed lever whose short lever arm 24 engages the supporting cable at its free end 18 via a flexible connection and whose long lever arm 25 is engaged by an adjustment mechanism 26 such as a hydraulic pivoting cylinder, lead-screw drive, etc.

Figure 3:
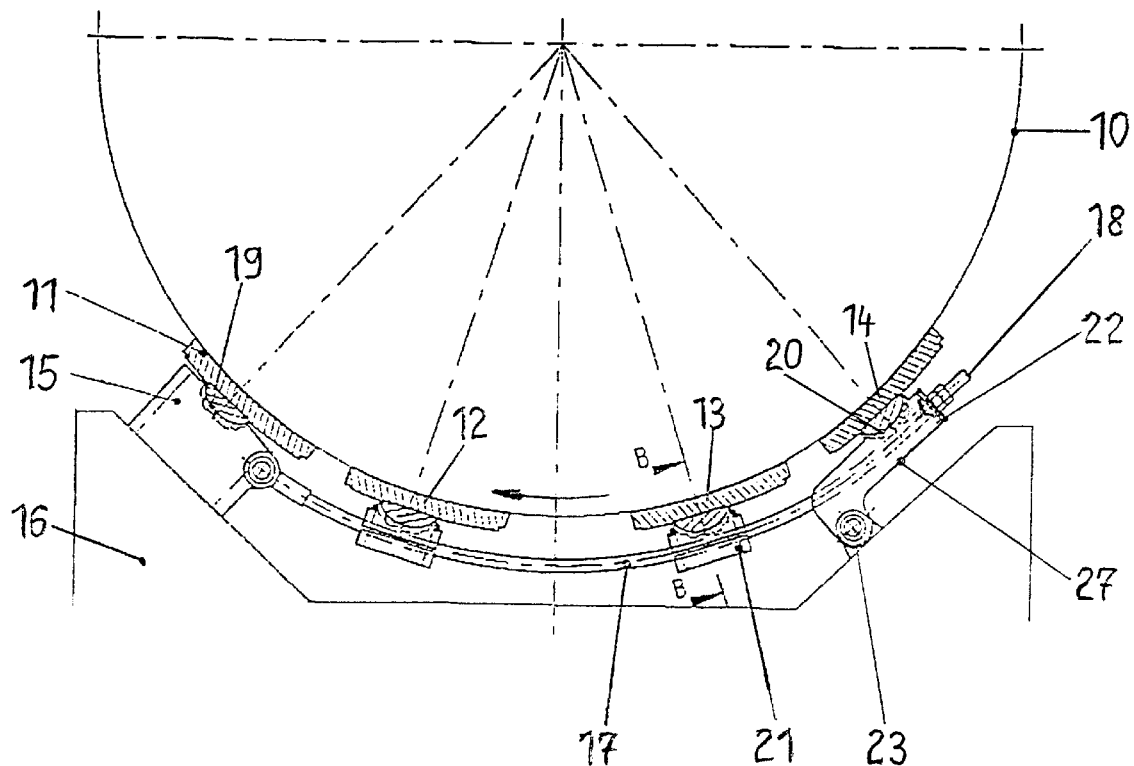
FIG. 3 shows a shoe bearing similar to support of FIG. 1 with a variant of the tensioning device engaging an end of the support cable.

As a variant to FIG. 1, according to the exemplary embodiment of FIG. 3, the arm for the holding and retensioning of the free end 18 of the supporting cable is made up of a single-armed lever on whose lever arm 27 the outlying shoe bearing element 14 is mounted. The pivot 23 for the lever arm 27 is circumferentially inward of the outlying shoe bearing element 14 and thus automatic tensioning of the supporting cable 17 is effected by the weight of rotary casing 10 acting on the lever arm 27.

The supporting cable 17 can be made up of a bundle of cables of smaller diameter and/or of a link chain and/or of tension rod sections, provided the flexible carrying system is capable of twisting and flexibly yielding within certain limits, in order to achieve the above-cited objectives and advantages of the shoe bearing according to the invention.

What is claimed:

1. A shoe bearing for supporting the lower circumferential region of a cylindrical casing (10) of a tube mill on a foundation (16), comprising:

a plurality of bearing stations spaced from one another in the axial direction of said cylindrical casing (10), each of said bearing stations including a fixed bearing block (15) on said foundation (16);

a supporting cable (17) having one end anchored on said bearing block (15);

shoe bearing elements (11, 12, 13, 14) spaced circumferentially from one another about said lower circumferential region of said cylindrical casing (10) including a pair of circumferentially outermost shoe bearing elements (11, 14) and at least two intermediate shoe bearing elements (12, 13) disposed circumferentially between said outermost shoe bearing elements (11, 14);

one of said outermost shoe bearing elements (11, 14) being supported directly on said foundation (16);

said intermediate shoe bearing elements (12, 13) and the other one of said outermost shoe bearing elements (11, 14) being secured to said supporting cable (17);

said outermost shoe bearing elements each include a bearing shell supporting said cylindrical casing (10), a lower supporting part and a spherical cap (19, 20) between said bearing shell and said lower supporting part and a tension device mounted on said foundation (16) and connected to the other end (18) of said supporting cable (17), said tension device being operable to adjust the tension of said supporting cable (17).

2. The shoe bearing as set forth in claim 1 wherein said intermediate and said other one of said outermost shoe bearing elements (12, 13, 14) are fixed on the supporting cable (17) by a clamp-block connection (21).

3. The shoe bearing as set forth in claim 1 wherein said tensioning device (22) includes an arm secured to said other end (18) of said supporting cable (17), said arm being pivotally connected to said foundation (16) by a pivot (23) whose axis is substantially parallel to the axis of said cylindrical casing (10).

4. The shoe bearing as set forth in claim 3 wherein said tensioning device (22) has a single lever arm (27) on which the other of said outermost shoe bearing elements (11, 14) is mounted.

5. The shoe bearing as set forth in claim 4 wherein said pivot (23) is disposed circumferentially inward of said other of said outermost shoe bearing elements (11, 14).

6. The shoe bearing as set forth in claim 1 wherein said tensioning device (22) includes a lever having a short lever arm (24) connected to said supporting cable (17), a long lever arm (25), a pivot (23) pivotable connecting said lever to said foundation on an axis parallel to the axis of said cylinderical casing (10) and an adjustment mechanism (26) mounted on said foundation and connected to said long lever arm (25), said adjustment mechanism being operable to pivot said lever about said axis of said pivot (23).

7. A shoe bearing for supporting the lower circumferential region of a cylindrical casing (10) of a tube mill on a foundation (16), comprising:

a plurality of bearing stations spaced from one another in the axial direction of said cylindrical casing (10), each of said bearing stations including a fixed bearing block (15) on said foundation (16);

a flexible support (17) having one end anchored on said bearing block (15);

shoe bearing elements (11, 12, 13, 14) spaced circumferentially from one another about said lower circumferential region of said cylindrical casing (10) including a pair of circumferentially outermost shoe bearing elements (11, 14) and at least two intermediate shoe bearing elements (12, 13) disposed circumferentially between said outermost shoe bearing elements (11, 14);

one of said outermost shoe bearing elements (11, 14) being supported directly on said foundation (16);

said intermediate shoe bearing elements (12, 13) and the other one of said outermost shoe bearing elements (11, 14) being secured to said flexible support (17);

said outermost shoe bearing elements each include a bearing shell supporting said cylindrical casing (10), a lower supporting part and a spherical cap (19, 20) between said bearing shell and said lower supporting part and a tension device mounted on said foundation (16) and connected to the other end (18) of said flexible support (17), said tension device being operable to adjust the tension of said flexible support (17).

8. The shoe bearing as set forth in claim 7 wherein said tensioning device (22) includes an arm secured to said other end (18) of said flexible support (17), said arm being pivotally connected to said foundation (16) by a pivot (23) whose axis is substantially parallel to the axis of said cylindrical casing (10).

* * * * *